US012809854B2

(12) United States Patent
Barnett et al.

(10) Patent No.: US 12,809,854 B2
(45) Date of Patent: Nov. 24, 2026

(54) PROPERTY GRAPH-BASED COMPARISON MECHANISM TO EVALUATE BLOCKCHAIN REQUESTS

(71) Applicant: Dell Products L.P., Round Rock, TX (US)

(72) Inventors: Alan Barnett, County Cork (IE); Matthew Keating, Cork (IE); Merry Globin, County Cork (IE)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 18/633,390

(22) Filed: Apr. 11, 2024

(65) Prior Publication Data

US 2025/0321951 A1 Oct. 16, 2025

(51) Int. Cl.
*G06F 16/23* (2019.01)

(52) U.S. Cl.
CPC ................................ *G06F 16/2379* (2019.01)

(58) Field of Classification Search
CPC .................................................. G06F 16/2379
See application file for complete search history.

(56) References Cited

U.S. PATENT DOCUMENTS

| | | | | |
|---|---|---|---|---|
| 10,121,025 | B1 * | 11/2018 | Rice | G06F 21/10 |
| 10,805,094 | B2 * | 10/2020 | Yoshihama | G06Q 20/401 |
| 11,108,544 | B2 * | 8/2021 | Vouk | H04L 63/12 |
| 11,403,301 | B2 * | 8/2022 | Zhou | G06F 16/951 |
| 11,704,671 | B2 * | 7/2023 | Ireland | G06Q 20/4014 705/44 |
| 12,100,393 | B1 * | 9/2024 | Smith | G06F 40/20 |
| 2016/0275182 | A1 * | 9/2016 | White | G06F 16/3329 |
| 2019/0278852 | A1 * | 9/2019 | Jayachandran | H04L 9/0643 |
| 2020/0212932 | A1 * | 7/2020 | Bier | H04L 9/0637 |
| 2020/0242604 | A1 * | 7/2020 | Falk | H04L 9/3236 |
| 2021/0240753 | A1 * | 8/2021 | Mehta | G06F 40/284 |
| 2023/0206329 | A1 * | 6/2023 | Cella | G06Q 20/405 |
| 2024/0303300 | A1 * | 9/2024 | Schilders | G06F 16/24568 |
| 2025/0252321 | A1 * | 8/2025 | Barnett | G06N 5/02 |
| 2026/0050935 | A1 * | 2/2026 | Kase | G06Q 30/0185 |

OTHER PUBLICATIONS

Google SafeSearch—https://www.google.com/safesearch.
Google CloudVision—https://cloud.google.com/vision/overview/docs/.

* cited by examiner

*Primary Examiner* — Jorge A Casanova
(74) *Attorney, Agent, or Firm* — Workman Nydegger

(57) ABSTRACT

One example method includes receiving, by a server, an initial blockchain request from a client, and the initial blockchain request includes a description, based on the description, performing a taxonomy phrase search of a taxonomy to identify one or more phrases that correspond to the description, receiving, from the client, a phrase selection indicating one of the phrase(s) selected by a user, performing a taxonomy word search of the taxonomy to identify one or more words that correspond to respective fields of the selected phrase(s), receiving, from the client, a completed blockchain transaction request that comprises the initial blockchain request and the selected phrase(s) and selected words, and adding, to a blockchain, the selected phrase(s) and selected words of the completed blockchain request.

18 Claims, 4 Drawing Sheets

PROPERTY GRAPH-BASED COMPARISON MECHANISM TO EVALUATE BLOCKCHAIN REQUESTS

FIELD OF THE INVENTION

Embodiments of the present invention generally relate to blockchains. More particularly, at least some embodiments of the invention relate to systems, hardware, software, computer-readable media, and methods, for controlling what information is added to a blockchain or other immutable ledger.

BACKGROUND

A major issue currently affecting blockchain platforms is placement of illegal content on the blockchain by malicious users. This is typically done by exploiting free-form editable fields in the blockchain request header to place the illegal content, which could be image bits of illegal images, or leaked personal identifying information, for example. A related issue to this is that the blockchain will push this data to any user running a full node, and those users could end up subsequently, and unknowingly, breaking the law by possessing the illegal content.

Though impacts to this issue currently typically manifest in the real-world as illegal content being placed on a blockchain, it will be appreciated that there is scope for further exploitation of this. For example, malicious code could be placed on the blockchain, and the distribution mechanism of blockchain would push this to all users running full nodes. One impact of this could be an injection attack on blockchain explorer UIs (user interfaces) which often use databases.

Finally, while possibly attractive in theory, retroactively removing illegal content from an affected blockchain is quite difficult, if not impossible, due to immutability. Removal of such content would require performance of a platform-wide operation typically referred to as a 'hard-fork.' However, operations such as this are rarely carried out, and may never have been carried out to expressly address illegal content residing on blockchain. Several governments and states are placing increased responsibility and penalties on online services to combat illegal content, which provides motivation to the service provider to actively address these issues.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
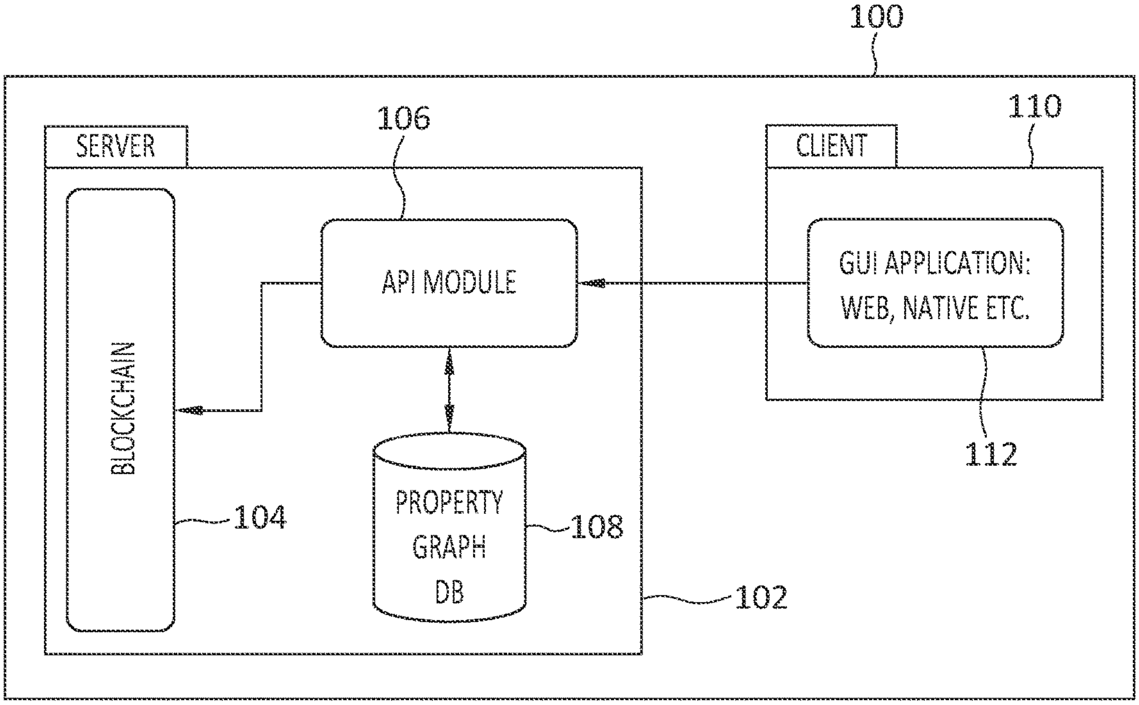
FIG. 1 discloses aspects of an architecture, according to one embodiment.

Embodiments of the present invention generally relate to blockchains. More particularly, at least some embodiments of the invention relate to systems, hardware, software, computer-readable media, and methods, for controlling what information is added to a blockchain or other immutable ledger.

One example embodiment comprises a templated messaging system underpinned by a property graph-based taxonomy of approved language to validate input to the blockchain and ensure that the input conforms to list of approved words and phrases. With regard to the property graph, in an embodiment, the words may be considered as defining respective nodes of the property graph, and the phrases as defining respective edges of the property graph that connect the nodes.

Upon receipt of a blockchain request from a user, one or more templated messages are presented, such as by a GUI application for example, to, and selectable by, the user, each comprising respective blank elements that will accept only terms from a predefined group. The message template selected by the user acts to implicitly filter out, or eliminate, aspects of the taxonomy that do not apply to that message. In this way, a search of the taxonomy for the words that may be entered in the blank elements of the message template may be relatively small in scope and, as such, may be performed relatively quickly. In an embodiment, a leading word, or other indicator, of the message may determine which elements of the taxonomy may apply to the message and thus be selected by the user.

Once the taxonomy search has been performed, the predefined group of terms, or template words, for each blank element in the message may be displayed/displayable to the user, and then selected by the user with a pulldown menu or other mechanism. In this way, the user can specify certain aspects of the blockchain request, but is prevented from simply entering freeform data in the fields due to the implicit constraint of the selectable terms. When the user has completed all the fields, the blockchain request can then be submitted. With this approach, the blockchain provider may have some assurance that no illegal or unauthorized content is being added to the blockchain.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that a blockchain provider may have assurance that no illegal or unauthorized content is being added to the blockchain. Thus, another advantage of an embodiment is that a blockchain provider may be shielded, to some extent at least, from legal liability that might otherwise arise if illegal or unauthorized content were shown to be present in the blockchain. An embodiment may operate relatively quickly, in part through the use of a search process that only partially observes a taxonomy. An embodiment may prevent the placement of illegal or unauthorized content on a blockchain, and thereby obviate the need for the use of processes, such as a hard-fork, to remove illegal or unauthorized content that has been placed on a blockchain. Various other advantages of one or more example embodiments will be apparent from this disclosure.

A. Overview of Aspects of an Example Embodiment

The following is an overview of an example embodiment of the invention. This discussion is not intended to limit the scope of the invention, or the applicability of the embodiments, in any way.

One example embodiment comprises an approach to mitigate the current problem on blockchain platforms of placement of unwanted data, such as illegal content and malicious code for example, which can be placed on the chain by exploiting free-form editable fields in the request header. Blockchain immutability compounds this problem, as does the decentralized nature of the blockchain. Many real-world examples of this issue on prominent blockchain platforms exist to date. Though some tools exist to combat illegal image content, it is almost impossible for state-of-the-art tools to identify leaked personal data if it has covertly, and recently, been leaked. This data, by nature, may also appear similar to the kind of data one May place in a fund transfer description. Thus, an embodiment may combat the placement of leaked personal data on blockchain platforms, and offering strong guarantees to block all illegal and unauthorized content.

One example embodiment services blockchains and distributed ledgers in order to resolve an ongoing issue in these areas. This embodiment may resolve the issue in a more user-friendly way than simply blocking the use of freely editable text fields, which are often needed to provide necessary functionality. An embodiment may resolve the issue of recently leaked private data being placed on blockchains, which may be quite to identify and resolve using conventional illegal content scrubbing methods, and even poses some problems for AI/ML (artificial intelligence/machine learning), since a 100% detection rate is difficult to achieve even with such technologies.

In more detail, an embodiment may prevent this illegal/unauthorized content from being placed on the blockchain in the first place, rather than reacting after the fact, when it has already become a difficult task to address. Thus, an embodiment comprises a templated messaging system underpinned by property-graph based taxonomy of approved language to validate input to the blockchain and ensure it conforms to an approved list of words and phrases. This is preferable to freely editable fields as it prevents abuse but is also preferable to removing such fields entirely as this would have a detrimental impact on usability. Thus, an embodiment may strike a balance between resolving the issue, while still maintaining a level of usability.

An embodiment may operate as a plugin or extension module which operates alongside, or as part of a blockchain API, while leaving the underlying blockchain system as-is. Such an embodiment may thus promote vendor agnosticism, meaning the embodiment may function effectively with any blockchain architecture once the freely editable request field of the API is mapped to an embodiment so that incoming requests can be proactively checked before any content is placed on the blockchain.

Aside from the technical differences, it is quite difficult for any conventional approach to reliably prevent illegal leaked personal data or other content from being placed on a blockchain. Comparison services to check against this are not common as possession of such data is so problematic for anyone other than the approved service or organization, and even services offering hash comparisons for personal identifying information are not prevalent in the same way as those attempting to address illegal images. A related problem concerning conventional approaches is how does one classify which data has been leaked until it shows up? Conventional approaches cannot account for this specific facet of illegal content placement on blockchain, while an example embodiment can.

B. Detailed Discussion of Aspects of an Example Embodiment

One example embodiment may comprise two main components. These may comprise a property graph-based taxonomy, and a comparison and verification module. Example embodiments of these components are discussed below.

B.1 Property Graph-Based Taxonomy

The first component is a property graph-based taxonomy of terms and phrases which underpins the verification of input fields to the blockchain to ensure that those terms and phrases conform to the approved phrases and words of the templating system. Phrases, that is, natural language phrases, describe a string of words but with blank elements which can be further customized using a limited group of template terms. The phrases may be formed in accordance with the context, and, in the case of one embodiment, caters to a blockchain and header inputs of a distributed ledger, such as a description field normally used to explain a transaction or identify a transfer, for example.

To illustrate, one of these description messages might read: "Payment from Bill to Thomas for the lunch yesterday" or "Transfer of Asset-1234 from DataSeller-1 to DataBuyer-2 for 15 USD." In an embodiment, an example of a generalized templated phrase which could cover these specific messages might read:

> "Payment from *SENDER* to *RECEIVER* for **** on *DD/MM/YYYY*" or "Transfer of *ITEM* from *SENDER* to *RECEIVER* for *AMOUNT* *CURRENCY*"

Here, the fields marked with an asterisk are customizable using template words. In this case, words describe yet another pre-defined element from the taxonomy, meaning natural language words which act as values that can be assigned to the variables in a given phrase.

While quite useful in constraining what information could be added to a blockchain, comparisons against these phrases and words could be extremely slow. Thus, an embodiment may employ a property graph to act as the taxonomy since, as discussed elsewhere herein, the use of a property graph in this way may enable searches of limited scope that may be performed relatively quickly. As well, a property graph may provide the ability to categorize taxonomy items, which can ensure through categorization that the words available to the user will make sense when placed into the phrase, thereby avoiding the generation of incorrect messages which, for example, could have amounts or dates placed where a sender username name should be. The taxonomy may also cater for custom words such as real usernames and item names or IDs from the underlying blockchain system.

B.2 Comparison and Verification Module

In an embodiment, the second component is a comparison and verification module which leverages the taxonomy of linked terms and phrases in order to carry out comparisons. As elements of phrases are variable, it is not possible to perform a direct comparison. Rather the phrase is identified by its opening language, or by some other topic-specific indicator. For example if the opening of the phrase is "Payment," then the majority of the taxonomy can be ignored for the phrase search, and only the specific portion of the taxonomy tree structure which handles payment-related phrases may be searched. By constraining the scope of the taxonomy search in this way, the time required to perform the search may be greatly reduced, relative to the amount of time it would otherwise take to search the entire taxonomy.

In an embodiment, the customizable variables in a phrase may be loaded with a specific word or piece of information such as, for example, the date or the username of a payment sender. This, too, enables much more efficient searching of the words in the taxonomy, as only those words compatible with a given phrase need to be searched and, once again, the remaining portions of the taxonomy can be ignored.

B.3 Example Architecture and Associated Method

An architecture 100 according to one example embodiment is disclosed in FIG. 1. As shown, a server 102 may host a blockchain 104. An API (application program interface) module 106 may be provided, possibly in the server 102, that interfaces with the blockchain 104 and with a property graph database 108 that stores a taxonomy. One or more clients 110 may interface with the blockchain 104 by way of the API module 106. In an embodiment, the client 110 may comprise a GUI (graphical user interface) application 112, and corresponding GUI, by way of which a user may make selections of phrases and words presented by the API module 106. Following is a discussion of an example workflow that may be implemented, according to an embodiment, in the architecture 100.

To begin, from the client 110, a user interacts with a blockchain backed application, such as the application 112, which may comprise a web-based UI. The user may create their transaction via the user interface, such as by adding a descriptive message to a transaction header, that is, a blockchain request header. The client 110 may then display to the user a form with various user-selectable phrases. When the user selects a top level phrase, available and relevant word list dropdowns are populated for each fillable term in that phrase. As noted elsewhere herein, this population process may be efficiently generated by leveraging the property graph database 108. When the fillable terms of the phrase have been completed, the use may submit a blockchain transaction request, or simply 'transaction request,' which is passed by client 110 to the API module 106. The API module 106 may then verify the incoming transaction request by running a query through the property graph database 108 to confirm that the transaction request header has not been modified in transit from the client 110. Upon successful verification, indicating that the transaction request header has not been modified, the transaction is submitted to the blockchain 104 by the API module 106.

B.4 Example Taxonomy and Hierarchy

Figure 2:
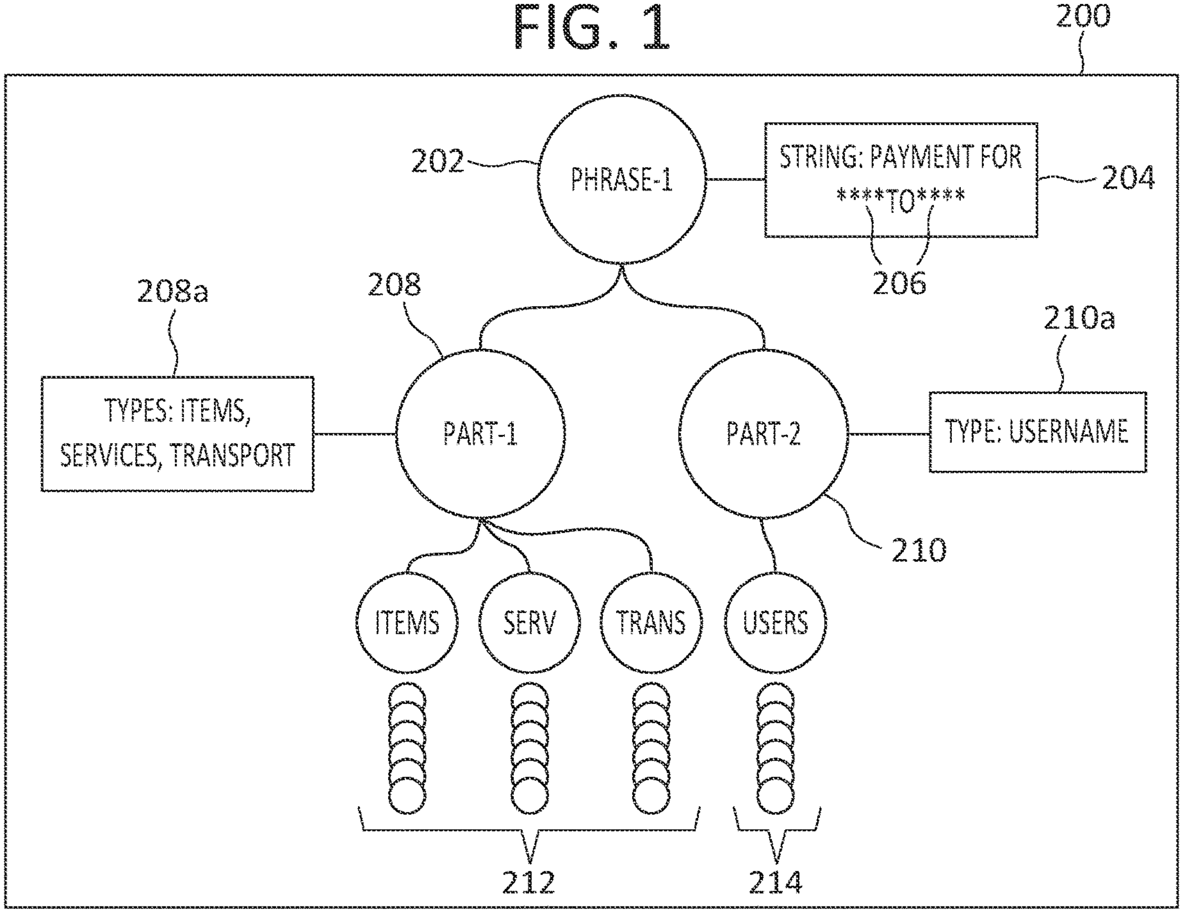
FIG. 2 discloses aspects of a taxonomy hierarchy structure, according to one embodiment.

With reference now to FIG. 2, an embodiment may leverage a taxonomy 200, comprising various 'word' and 'phrase' elements. This taxonomy 200 defines the categorization of elements within a proposed vocabulary, and may be viewed similarly to a database schema. The key differentiator, from a database schema, with a vocabulary taxonomy such as the taxonomy 200 is that the taxonomy 200 may only implement a hierarchical or tree like structure. This enables an embodiment to leverage a custom taxonomy to organize and filter related elements in a logical and efficient manner.

In the example of FIG. 2, the taxonomy 200 comprises a phrase 202 that includes a string 204 with various elements 206 that may be filled with user-specified terms from the taxonomy, namely, the phrase 'Payment for ** to .' These elements , referenced at 206, are identified as Part-1 208 and Part-2 210 of the string 204. Each of the Parts-1 and -2 is of a particular type, consistent with the structure and type specified of the phrase 202. For example, Part-1 208 is a product/service type 208*a* and thus enables a user to enter, in the string 204, an applicable service or product, specific examples of which are indicated at 212. Similarly, Part-2 210 is a 'username' type 210*a* and thus enables a user to enter, in the string 204, an applicable username, specific examples of which are indicated at 214**.

With attention now to FIG. 3, a more detailed version of the taxonomy 200 is shown at 300. In FIG. 3, various example phrases 302 are indicated, namely a 'payment for **' phrase 304, and a 'transfer from  to ' phrase 306. In this example, the phrases 302 may be considered as the uppermost level of a hierarchy. Various words 308 form the next lower level of the hierarchy. The words 308 themselves may define an internal hierarchy that includes general categories 310, and respective specific instances 312 of one or more of the categories 310. In the example of FIG. 3, the general categories 310** comprise 'Services,' 'Transport,' 'Items' and 'Username.'

Note that not all words 308 in the taxonomy 300 necessarily apply to all phrases 302 in the taxonomy 300. For example, the word 'Username' applies to the phrase 306 but not to the phrase 304. For example, it would make little sense for the phrase 304 to read 'Payment for username.' Further, a word 310 may only apply to a specific field in a phrase 304. For example, it would make little sense for the phrase 306 to read 'Transfer username from ** to ' since the intent of that phrase 306 is to refer to a transfer of a good, or service. Thus, it would be most appropriate for an 'Item' to appear in the first field of the phrase 306, and respective 'Username' values in the remaining two fields of the phrase 306**.

Figure 3A:
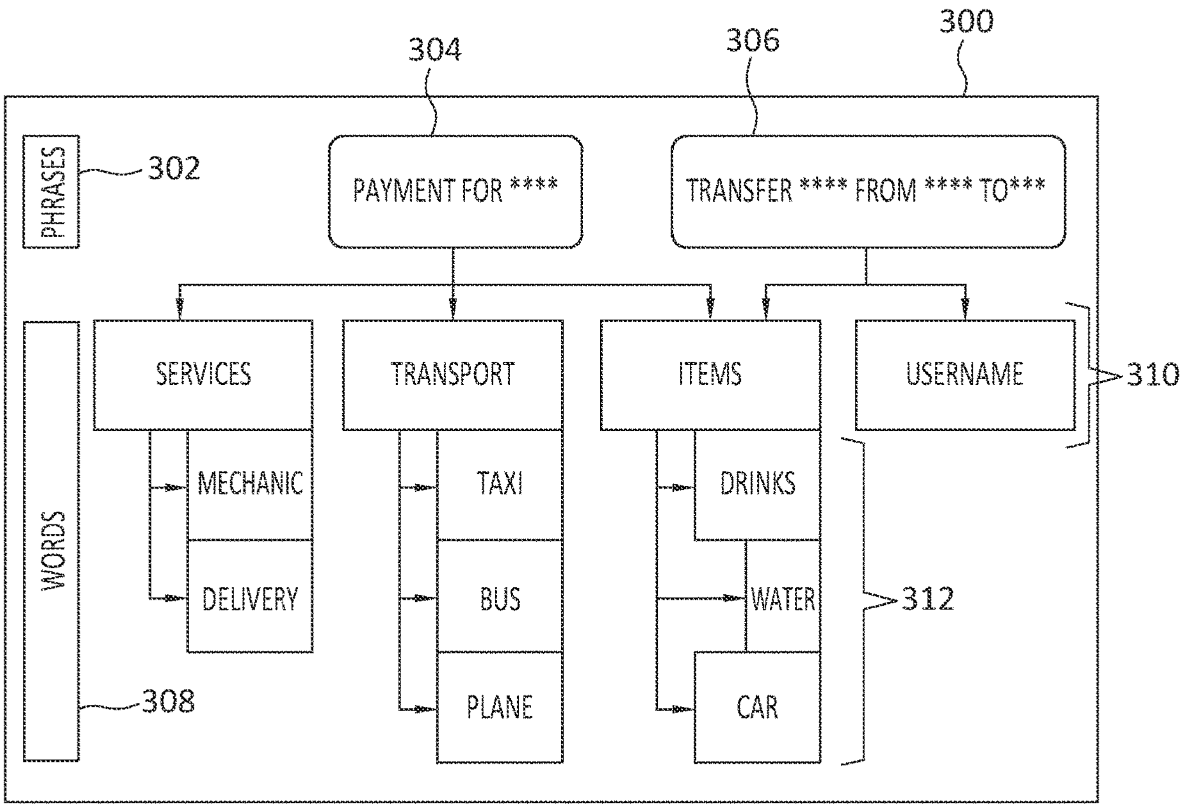
FIG. 3*a* discloses aspects of the structure of taxonomy words and phrases, according to one embodiment.
Figure 3B:
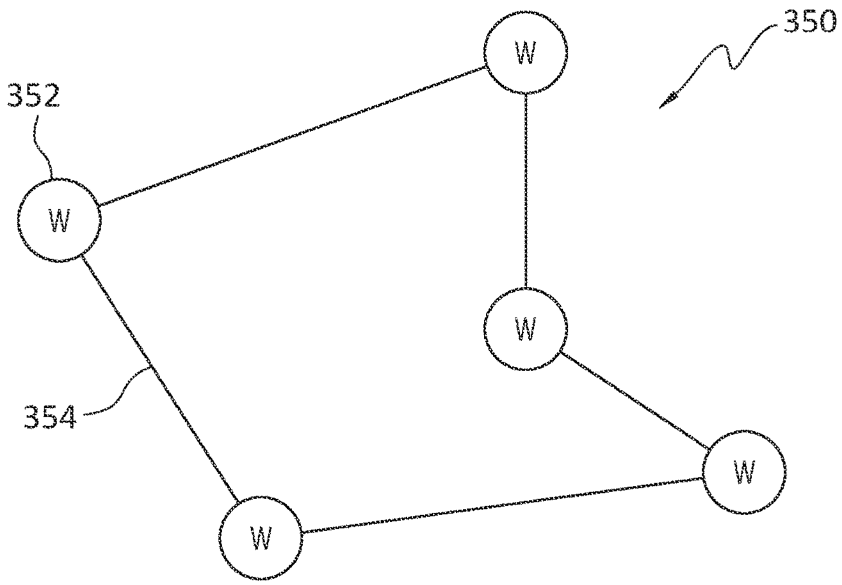
FIG. 3*b* discloses aspects of an example property graph according to one embodiment.

With reference now to FIG. 3*b*, an example of a property graph is denoted at 350. In general, the property graph 350 may be constructed such that each word of a taxonomy is represented by a respective node 352, and each phrase of a taxonomy is represented by a respective edge 354. As shown, the edges 354 may connect the nodes 352. Note that not every node 352 is necessarily connected to every other node 352, while some nodes 352 may be connected to multiple other nodes 352, and not every edge 354 touches every node 352. In one alternative arrangement, each word of a taxonomy may be represented by an edge 354, and each phrase of the taxonomy may be represented by a node 352. Neither of these particular arrangements is necessarily required in an embodiment however.

With continued reference to the examples of FIGS. 2, 3*a*, and 3*b*, those figures form a basis of the technical implementation of a validator component, discussed below. As shown in those Figures, one or more top-level phrases may be defined, with a one-to-many relationship of words for each phrase. A user defined level of granularity and customization can be defined and used to extend a taxonomy, such as the taxonomies 200 and 300 for example, to enable use across various domains.

In order to implement an enforce user input verification, the technical implementation of a taxonomy may be based on a property graph database model, a simple example of which is disclosed in FIG. 3*b* discussed above. In an embodiment, a Property Graph data model may comprise various useful features. For example, the data structure implemented is much more suitable, and efficiently queried, in a graph traversal structure rather than traditional or relational modes.

As useful feature is that property graphs may enable edges between nodes to be labelled, meaning each edge can have data describing additional information about itself. In an embodiment, this feature may be leveraged for the purpose of creating new properties, such as words, and relationships, such as phrases, without the need to modify the underlying schema. This may make it easier to work with data that is evolving or subject to frequent changes, and may enable a blockchain provider to readily adapt to changing circumstances and requirements. Moreover, the property graph data structure according to an embodiment is much more efficiently queried using graph traversal and pattern matching, rather than traditional or relational querying.

Still another useful feature of property graphs is that relationship properties can also be used to apply translations to other languages to a node. Thus, rather than requiring a new node in the taxonomy for each different language translation of that word, the translations can simply be attached to the initial node as properties.

C. Further Discussion

As apparent from this disclosure, one or more embodiments may possess various useful features and aspects, although no embodiment is required to possess any of such features and aspects. The following examples are illustrative.

An embodiment may employ a property graph-based checking mechanism to comprehensively block illegal or unauthorized content being placed on a blockchain. This addresses the active issue of illegal content being placed on blockchain with a level of guarantee that cannot be provided by machine learning or artificial intelligence models, which cannot guarantee 100% accuracy and a level of usability that block-lists cannot enable. The efficiency of the graph technologies underpinning an embodiment also enable an embodiment to rival even the more efficient commonplace mechanisms such as image comparison hash banks. The idea of property graphs underpinning an API input verification mechanism is thought to be new.

As another example, an embodiment may comprise what is thought to be a new application area for property graphs, by addressing illegal content, and unauthorized content, on blockchain and forming part of an API input checking mechanism. In an embodiment, property graph properties are useful to hold translations to other languages—from the English wording of a taxonomy. Thus, an embodiment may be effectively employed in a multi-lingual context while also maintaining context, that is, the taxonomy will be implicitly aware that the translations are associated with each other which can provide benefits in property graph traversal efficiency.

D. Aspects of Some Example Use Cases

Following is brief discussion of some possible scenarios for application of an embodiment, in the blockchain context, deal with the problem of illegal and/or unauthorized content in a blockchain. These are provided only by way of illustration and are not intended to limit the scope of the invention or claims in any way.

D.1 Example 1

As noted herein, an embodiment may leverage property-graph technology to underpin the illegal content blocking functionality and, as such, can be said to "sit in-front" of, or upstream of, the blockchain, rather than being embedded into the blockchain itself. As such, implementation and use of an embodiment may be a relatively simple process, involving simply attaching to the API, and accordingly low-cost, and low-effort to integrate into a system. By way of contrast, current scenarios are quite problematic, at least with respect to the cost and effort required to remove illegal or unauthorized content once that content has been placed on the blockchain.

In particular, direct intervention to remove content from a blockchain must come in the form of an action like a hard-fork, which is a major change to the blockchain that can render invalid blocks valid, and render valid blocks invalid, which could be of use for scrubbing the blockchain of illegal content, among other things. The cost of a hard-fork process is something that opinions differ on, but it often requires majority acceptance from the userbase, in the case of a public blockchain, and historically has only been applied for incidents such as major security issues that need direct intervention to resolve. It is thought that, at present, a hard fork has never been carried out by a major blockchain provider for the purpose of scrubbing illegal content from the blockchain. Several major blockchain providers have multiple illegal content images on their blockchain which have been there, unaddressed, for years. This demonstrates a lack of incentive to address the problem, however, a persuasive incentive may be provided by new illegal content legislation which will place pressure on blockchain platforms to act. It also suggests that resolving the problem is not an easy fix once the illegal content is on the blockchain, which illustrates a problem that may be proactively avoided through the use of an example embodiment.

D.2 Example 2

Aside from the usefulness of an embodiment to prevent illegal content being placed on blockchains, an embodiment may imply the inertia of a blockchain platform to combat illegal content being placed on it, and may support a company in claiming that it had taken reasonable measures to prevent incidents from occurring, which may be of potential importance legally to show that a company made attempts to comply with legislation concerning illegal and unauthorized content. As well, aspects of an embodiment may be incorporated into a compliance standard for a blockchain provider.

E. Additional Considerations

The broader area of combatting illegal content has an advanced level of work, typically using tools to trawl through online sites such as social media and use AI and ML to detect and remove illegal content which has been placed there. These typically do not work in a preventative context, as an example embodiment does, but rather a reactive mode, making them unsuitable for preventing illegal content being placed on a blockchain in the first instance.

Some conventional tools attempt to validate incoming text. However, such preventative scanning of incoming API inputs cannot guarantee that one hundred percent of unwanted content is caught. This normally does not matter as it can usually be removed from a platform. However, this is not the case with blockchain, where even one artifact of illegal content is problematic and cannot be removed without extreme difficulty and, further, may expose a blockchain provider to legal liability.

Some existing services use a library of hashes representing known proliferated illegal content in order to check against, as possessing the content itself is of course illegal. One problem with this approach is that changing even a miniscule portion of the illegal content can fool the hash comparison, for example, changing the color of a single pixel of an illegal image, or one letter in leaked personal information.

Finally, increasing responsibility is being placed on online services regarding pressuring them into dealing with illegal content placed on them. National governments, such as the UK, and larger collectives such as the European Union, have both passed legislation and regulations which now tighten responsibilities and consequences, including legal and financial, for services on which illegal content is placed. This manifests itself as a much lower tolerance for companies who do not rapidly remove such content, and for those who do not take the appropriate measures against it.

The aforementioned legislation will apply to any services operating in regions that pass similar bills. There may be a special focus on the blockchain technology as these architectures in particular will have an extremely difficult time in combatting illegal content on their systems, and in coming up with truly effective responses to illegal content that do not impact their systems negatively. Blockchain covers a huge variety of industries, from cryptocurrencies to internet connected vehicle and automotive, along with many more. Thus, embodiments may be implemented in a variety of domains and industries, and may be particularly useful for companies who do not see freely editable text fields as desirable for their services, but still wish to allow the user to write some form of description or message, with the incentive to do this being a legal one, and to a lesser extent a general cybersecurity one.

F. Example Methods

Figure 4:
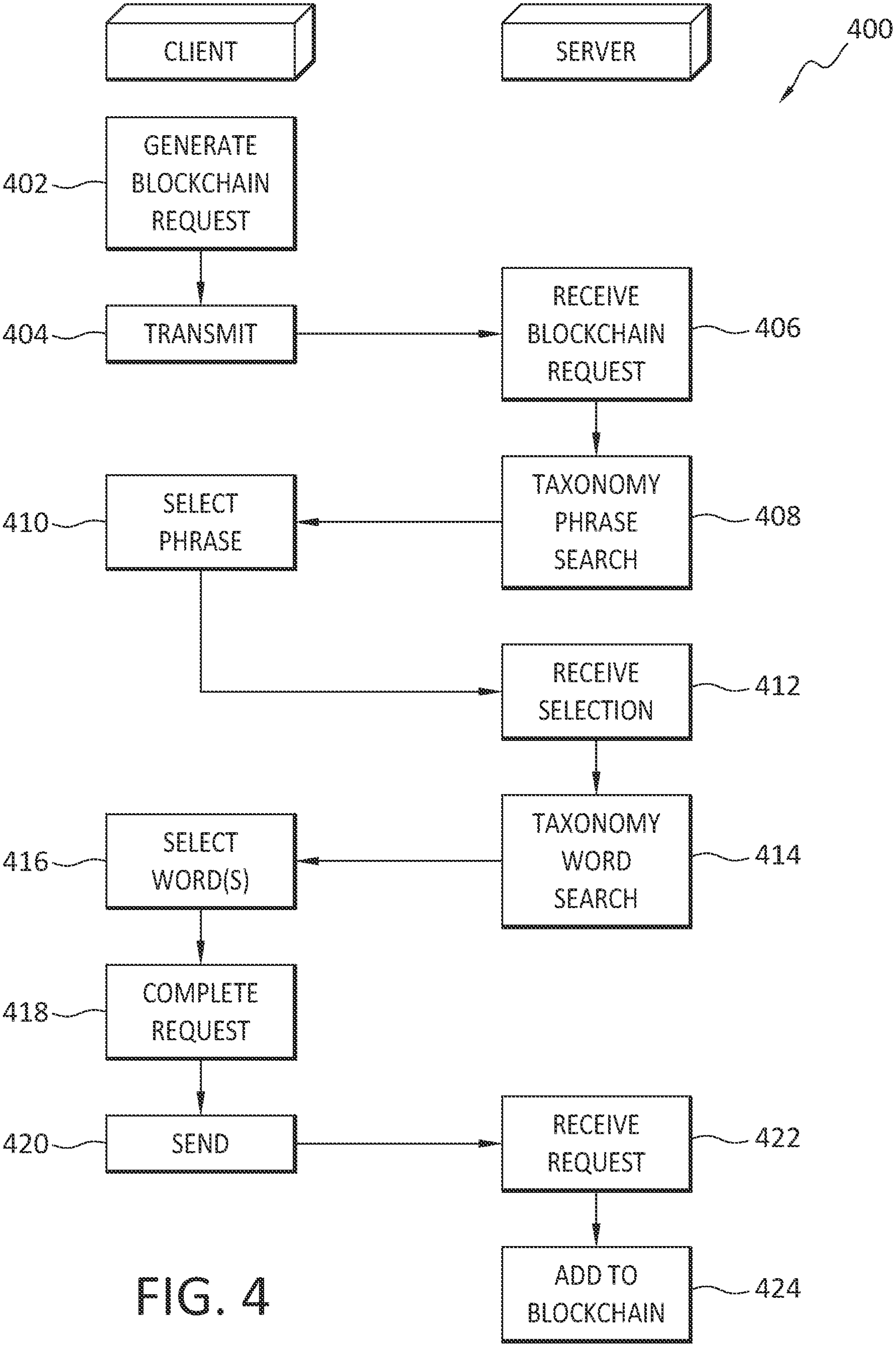
FIG. 4 discloses an example method, according to one embodiment.

It is noted with respect to the disclosed methods, including the example method of FIG. 4, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, an example method according to one embodiment is denoted at 400. In an embodiment, the method 400 may be cooperatively performed by a blockchain server, and a client that may be operated by a user.

The method 400 may begin when the client generates 402, and transmits 404, a blockchain transaction request to add material to a blockchain. A blockchain server may receive 406 the blockchain request and may parse the blockchain transaction request header for descriptive information that indicates generally what a user wants to add to the blockchain. Based on the descriptive information, the server may perform a taxonomy search 408 to identify phrases that possibly correspond to the blockchain transaction request.

The phrases may be identified to the user, and the user may, by way of the client, select 410 an appropriate phrase. The server may receive 412 the selection and, based on the selected phrase, perform a taxonomy search 414 to find words that correspond to the fields of the selected phrase. The words identified in the taxonomy search 414 may be made available to the user, who may select 416, for each field of the selected phrase, the appropriate word(s).

When all of the fields of the selected phrase have been completed by the user, the user request may be considered as complete 418. The completed request may then be transmitted 420 to the server. The server may then receive 422 the request, and add 424 the requested information to the blockchain.

G. Further Example Embodiments

Following are some further example embodiments of the invention. These are presented only by way of example and are not intended to limit the scope of the invention in any way.

Embodiment 1. A method, comprising: receiving, by a server, an initial blockchain request from a client, and the initial blockchain request includes a description; based on the description, performing a taxonomy phrase search of a taxonomy to identify one or more phrases that correspond to the description; receiving, from the client, a phrase selection indicating one of the phrase(s) selected by a user; performing a taxonomy word search of the taxonomy to identify one or more words that correspond to respective fields of the selected phrase(s); receiving, from the client, a completed blockchain transaction request that comprises the initial blockchain request and the selected phrase(s) and selected words; and adding, to a blockchain, the selected phrase(s) and selected words of the completed blockchain request.

Embodiment 2. The method as recited in any preceding embodiment, wherein the taxonomy phrase search and the taxonomy word search are performed on a single taxonomy.

Embodiment 3. The method as recited in any preceding embodiment, wherein the taxonomy phrase search and the taxonomy word search comprise searching a property graph in which one of the words and phrases are represented by respective nodes, and the other of the words and phrases are represented by edges that connect two or more of the nodes.

Embodiment 4. The method as recited in any preceding embodiment, wherein the taxonomy phrase search and the taxonomy word search comprise searching less than an entire property graph.

Embodiment 5. The method as recited in any preceding embodiment, wherein the phrases do not include any free-form text input fields.

Embodiment 6. The method as recited in any preceding embodiment, wherein the user is prevented from inputting, to the blockchain transaction request, anything other than the words or the phrases.

Embodiment 7. The method as recited in any preceding embodiment, wherein the server communicates with the client by way of an API (application program interface) included in the server and located in front of the blockchain.

Embodiment 8. The method as recited in any preceding embodiment, wherein the taxonomy has a hierarchical structure with the phrases at a top of the hierarchical structure, and the words below the phrases in the hierarchical structure.

Embodiment 9. The method as recited in any preceding embodiment, wherein after the completed blockchain request has been received from the client, a check is performed to verify that a request header of the completed blockchain request has not been modified in transmit from the client to the server.

Embodiment 10. The method as recited in any preceding embodiment, wherein the phrases each comprise one or more elements in which one of the words may be inserted.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
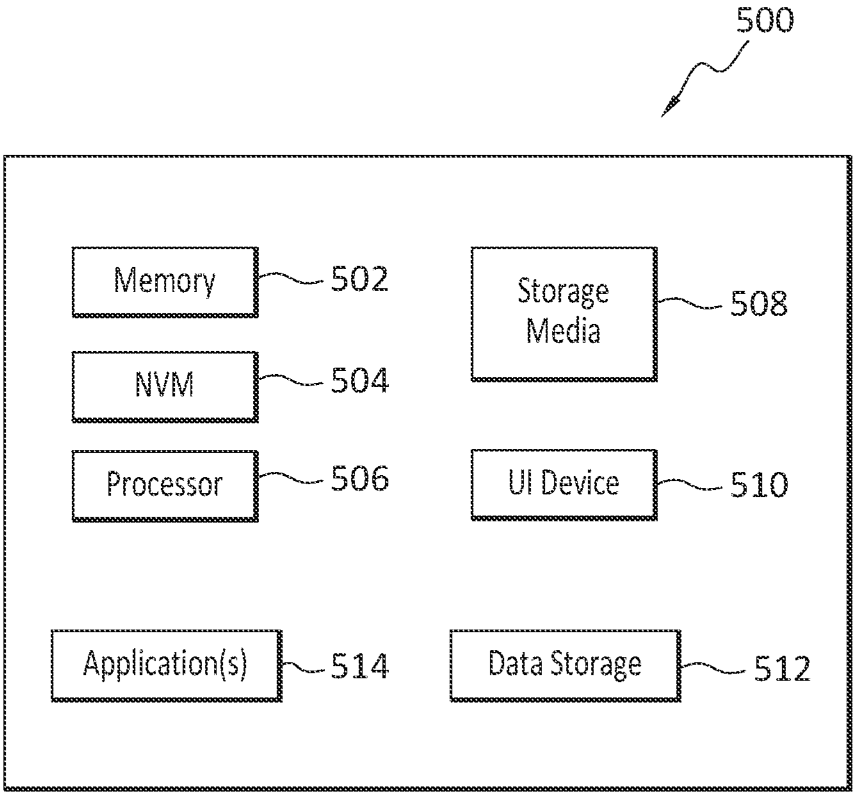
FIG. 5 discloses an example computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, by a server, an initial blockchain request from a client, wherein the initial blockchain request includes a description;

based on the description, performing a taxonomy phrase search of a taxonomy to identify one or more phrases that correspond to the description and conform to an approved list of phrases, which are approved to be entered into a blockchain;

receiving, from the client, a phrase selection indicating a phrase of the one or more phrases selected by a user;

performing a taxonomy word search of the taxonomy to identify one or more words that correspond to respective fields of the selected phrase(s) and conform to an approved list of words, which are approved to be entered into the blockchain;

receiving, from the client, a user selection indicating words of the one or more words selected by the user;

generating a completed blockchain request that comprises the initial blockchain request, and the selected phrase, and the selected words; and adding, to the blockchain, the selected phrase, and the selected words of the completed blockchain request, wherein the one or more phrases do not include any free-form text input fields.

2. The method as recited in claim 1, wherein the taxonomy phrase search and the taxonomy word search are performed on a single taxonomy.

3. The method as recited in claim 1, wherein the taxonomy phrase search and the taxonomy word search comprise searching a property graph in which one of the words and phrases are represented by respective nodes, and the other of the words and phrases are represented by edges that connect two or more of the nodes.

4. The method as recited in claim 1, wherein the taxonomy phrase search and the taxonomy word search comprise searching less than an entire property graph.

5. The method as recited in claim 1, wherein the user is prevented from inputting, to the initial blockchain request, anything other than the words or the phrases.

6. The method as recited in claim 1, wherein the server communicates with the client by way of an API (application program interface) included in the server and located in front of the blockchain.

7. The method as recited in claim 1, wherein the taxonomy has a hierarchical structure with the phrases at a top of the hierarchical structure, and the words below the phrases in the hierarchical structure.

8. The method as recited in claim 1, wherein after the completed blockchain request has been received from the client, a check is performed to verify that a request header of the completed blockchain request has not been modified in transmit from the client to the server.

9. The method as recited in claim 1, wherein the phrases each comprise one or more elements in which one of the words may be inserted.

10. A non-transitory storage medium having stored therein instructions that are executable by one or more hardware processors to perform operations comprising:

receiving, by a server, an initial blockchain request from a client, wherein the initial blockchain request includes a description;

based on the description, performing a taxonomy phrase search of a taxonomy to identify one or more phrases that correspond to the description and conform to an approved list of phrases, which are approved to be entered into a blockchain;

receiving, from the client, a phrase selection indicating a phrase of the one or more phrases selected by a user;

performing a taxonomy word search of the taxonomy to identify one or more words that correspond to respective fields of the selected phrase and conform to an approved list of words, which are approved to be entered into the blockchain;

receiving, from the client, a user selection indicating words of the one or more words selected by the user;

generating a completed blockchain request that comprises the initial blockchain request, and the selected phrase, and the selected words; and adding, to the blockchain, the selected phrase, the selected words of the completed blockchain request, wherein the one or more phrases do not include any free-form text input fields.

11. The non-transitory storage medium as recited in claim 10, wherein the taxonomy phrase search and the taxonomy word search are performed on a single taxonomy.

12. The non-transitory storage medium as recited in claim 10, wherein the taxonomy phrase search and the taxonomy word search comprise searching a property graph in which one of the words and phrases are represented by respective nodes, and the other of the words and phrases are represented by edges that connect two or more of the nodes.

13. The non-transitory storage medium as recited in claim 10, wherein the taxonomy phrase search and the taxonomy word search comprise searching less than an entire property graph.

14. The non-transitory storage medium as recited in claim 10, wherein the user is prevented from inputting, to the initial blockchain request, anything other than the words or the phrases.

15. The non-transitory storage medium as recited in claim 10, wherein the server communicates with the client by way of an API (application program interface) included in the server and located in front of the blockchain.

16. The non-transitory storage medium as recited in claim 10, wherein the taxonomy has a hierarchical structure with the phrases at a top of the hierarchical structure, and the words below the phrases in the hierarchical structure.

17. The non-transitory storage medium as recited in claim 10, wherein after the completed blockchain request has been received from the client, a check is performed to verify that a request header of the completed blockchain request has not been modified in transmit from the client to the server.

18. The non-transitory storage medium as recited in claim 10, wherein the phrases each comprise one or more elements in which one of the words may be inserted.

* * * * *